United States Patent Office 2,904,420
Patented Sept. 15, 1959

2,904,420

GAS PRODUCING COMPOSITIONS

Kenneth Urmston Holker, West Kilbride, Scotland, assignor to Imperial Chemical Industries Limited, London, England, a corporation of Great Britain No Drawing. Application June 25, 1957
Serial No. 667,969

Claims priority, application Great Britain
August 13, 1956

1 Claim. (Cl. 52—.5)

The present invention relates to new and improved gas producing compositions of the kind capable in compressed condition of propagating self sustained non detonating gas producing decomposition through themselves when locally heated.

For some applications it is essential to employ gas producing charges giving rise to gases which do not contain large proportions either on the one hand of free oxygen or oxides of nitrogen or on the other hand of oxygen-consuming products such as carbon monoxide, hydrogen, hydrocarbons, or ammonia. Compositions of this type may consist of an oxidant, such as ammonium nitrate and/or potassium nitrate in admixture with an appropriate quantity of an organic fuel, for example, guanidine nitrate or nitroguanidine, together with one or more sensitisers of the thermal decomposition of the mixture. The sensitising agents in the case of these particular fuels may include pulverulent copper and copper compounds, chromates and polychromates, for example, potassium chromate or ammonium dichromate. The decomposition of mixtures of this type produces gases at very high temperatures which even in the case of fuels whose oxygen deficiencies are comparatively low, as in the case of the two above named compounds are of the order of 1800–2000° C. For certain applications, however, such high temperatures cannot be tolerated and charges are required giving gases of similar character at substantially lower temperatures than result from the use of the oxidant and the fuel with the sensitiser without a cooling agent.

It was to be expected that inorganic carbonates which decompose endothermically, could be used as cooling agents but we have found that the burning rate of pellets of compositions containing magnesium and calcium carbonates artificially prepared by precipitation from solutions of soluble magnesium or calcium salts were very low, and that if more than 15–20% of such a carbonate was included in the composition, the pellets were extremely difficult to ignite and were not capable of self sustained decomposition at atmospheric pressure. Furthermore, consolidation of charges of compositions containing these cooling agents was poor, the charges frequently exhibiting radial cracks, a fault which could not be overcome by granulation of the powder. In addition, the introduction of the so prepared carbonates in the composition lowered the stability on hot storage.

We have now discovered that by using in admixture with the aforesaid oxidant, the organic fuel, and the sensitiser, the naturally occurring magnesium carbonates dolomite or magnesite, gas producing composition can be obtained which may be ignited and decomposed in a satisfactory manner, which consolidate well on pressing, and which have thermal stabilities similar to those of the parent compositions containing no cooling agent. The naturally occurring magnesium carbonates have a higher bulk density than the precipitated carbonates, which may be a factor affecting the capacity of the mixture for consolidation. Other naturally occurring carbonates, e.g. calcite and chalk, also have higher bulk densities than the synthetic compounds but the stability of gas producing compositions containing these ingredients as cooling agents is inferior to that of similar compositions containing dolomite or magnesite as cooling agents.

In the case where the gas producing composition comprises a sensitised mixture of ammonium nitrate, potassium nitrate and guanidine nitrate and produces only a small percentage of oxygen consuming gases or free oxygen or oxides of nitrogen in the gaseous products up to 40% of dolomite or magnesite may be used as cooling agent.

In preparing the compositions of the present invention, since the addition of cooling agents reduces the rate of burning of the composition, it may be necessary, by suitably choosing the proportion of cooling agent, to strike a compromise between the desired amount of cooling and the maintenance of a desired burning rate. The rates of reaction and the gas temperature of mixtures containing different proportions of cooling agent are determined at the required operating pressure, and the most suitable composition is selected.

The invention is further illustrated by the following examples in which parts of solid ingredients are by weight.

*Example 1*

A gas producing composition was made by intimately mixing together the following powdered ingredients:

| | Parts |
|---|---|
| Guanidine nitrate | 32.0 |
| Ammonium nitrate | 33.8 |
| Potassium nitrate | 3.8 |
| Dolomite | 24.8 |
| Ammonium dichromate | 3.7 |
| Copper oxalate | 2.0 |

Charges produced by compressing this composition at a pressure of approximately 800 kg./sq. cm. supplied gases containing, in addition to steam, the constituents shown below, at a temperature of 1100° C. and a pressure of 42 kg./sq. cm. and had a reaction rate of 0.20 cm. per sec. when the reaction was initiated by local heating of a portion of the charge at atmospheric pressure by means of an igniter composition yielding a hot slag.

| | Parts by volume |
|---|---|
| Ammonia | 1.3 |
| Oxides of nitrogen | 1.4 |
| Carbon dioxide | 26.7 |
| Oxygen | 0.9 |
| Hydrogen | 1.3 |
| Carbon monoxide | 1.8 |
| Nitrogen | 66.8 |

In a vacuum stability test, five grams of the composition evolved 0.5 ml. of gaseous decomposition products after heating for 40 hours at 100° C.

Pellets of similar compositions containing artificially prepared magnesium carbonate or calcium carbonate as cooling agent were extremely difficult to ignite and were not capable of self sustained decomposition at atmospheric pressure. In the vacuum stability test 3.6 and more than 15 ml. of gaseous decomposition products respectively were evolved from 5 g. samples of these compositions after 40 hours at 100° C.

*Example 2*

A gas producing composition was made by intimately mixing together the following powdered ingredients:

| | Parts |
|---|---|
| Guanidine nitrate | 25.6 |
| Ammonium nitrate | 27.1 |
| Potassium nitrate | 2.8 |
| Dolomite | 39.6 |

| | |
|---|---|
| Ammonium dichromate | 2.8 |
| Copper oxide | 2.0 |

Charges produced by pressing this composition at approximately 800 kg./sq. cm. supplied gases at a temperature of 800° C. and a pressure of 42 kg./sq. cm. and had a rate of reaction of 0.13 cm./sec. when the reaction was initiated by local heating of a portion of the charge, at atmospheric pressure by means of an igniter composition yielding a hot slag. In the vacuum stability test, a 5 g. sample of the composition evolved 1.5 ml. of gaseous products after 40 hours at 100° C.

Similar compositions containing artificially prepared magnesium or calcium carbonates as cooling agents were incapable of self sustained decomposition and 5 g. samples of these compositions evolved more than 15 ml. and 12.0 ml. respectively of gaseous decomposition products after 40 hours at 100° C. in the vacuum stability test.

*Example 3*

A gas producing composition was made by intimately mixing together the following powdered ingredients:

| | Parts |
|---|---|
| Guanidine nitrate | 32.3 |
| Ammonium nitrate | 34.2 |
| Potassium nitrate | 3.8 |
| Magnesite | 25.0 |
| Ammonium dichromate | 3.7 |
| Copper oxide | 1.0 |

Charges produced by pressing this composition at approximately 800 kg./sq. cm. supplied gases containing in addition to steam the constituents shown below, at a temperature of 1100° C. and a pressure of 42 kg./sq. cm. and had a rate of reaction of 0.25 cm./sec. when the reaction was initiated by local heating of a portion of the charge at atmospheric pressure by means of an igniter composition yielding a hot slag.

| | Parts by volume at 20° C. |
|---|---|
| Ammonia | 0.9 |
| Oxides of nitrogen | 0.9 |
| Carbon dioxide | 20.2 |
| Oxygen | 0.2 |
| Hydrogen | 2.4 |
| Carbon monoxide | 1.6 |
| Nitrogen | 73.9 |

A five gram sample of the composition evolved no gaseous decomposition products in the vacuum stability test after 40 hours at 100° C.

Similar compositions containing artificially prepared calcium or magnesium carbonate as cooling agent were incapable of self sustained decomposition at atmospheric pressure and 5 g. samples of the mixtures evolved approximately 8 ml. of gaseous decomposition products after 40 hours at 100° C.

What we claim is:

A gas producing composition adapted to be compressed into pellets and of propagating self-sustaining non-detonating gas producing decomposition throughout itself when locally heated consisting essentially of an oxidant selected from the group consisting of alkali metal nitrates and ammonium nitrate, an organic fuel selected from the group consisting of guanidine nitrate and nitroguanidine, a sensitizing agent selected from the group consisting of pulverulent copper, a copper compound, chromates and polychromates, and from 15 to 40% by weight of the total composition of a naturally occurring carbonate of magnesium selected from the group consisting of magnesite and dolomite.

References Cited in the file of this patent
UNITED STATES PATENTS

| | | |
|---|---|---|
| 988,858 | Bronstein | Apr. 4, 1911 |
| 2,159,234 | Taylor | May 23, 1939 |
| 2,481,795 | Taylor | Sept. 13, 1949 |